3,393,067
PROCESS FOR PRODUCING ALLOYS CONTAINING CHROMIUM AND DISPERSED REFRACTORY METAL OXIDE PARTICLES
Guy B. Alexander, Brandywine Hundred, and John B. Lambert, Mill Creek Hundred, Del., assignors, by mesne assignments, to Fansteel Metallurgical Corporation, a corporation of New York
No Drawing. Filed Dec. 18, 1964, Ser. No. 419,580
4 Claims. (Cl. 75—130.5)

This invention relates to processes for producing chromium alloy compositions in which submicron, refractory metal oxide particles are dispersed, and is more particularly directed to the steps, in such processes, comprising (1) preparing a mixed oxide powder containing (a) chromium oxide, (b) an oxide of a metal selected from the group consisting of iron, cobalt and nickel, and (c) a refractory oxide in the form of particles less than 0.25 micron in diameter and having a free energy of formation ($\Delta F$.) at 1000° C. above 90 kilocalories per gram atom of oxygen in the oxide, (2) mixing with said powder up to one gram atom of carbon per gram atom of oxygen combined with the chromium in said chromium oxide, (3) heating the mixture at a temperature in the range from 850° C. to 1050° C. in an environment selected from vacuum and a flowing stream consisting of at least one gas of the group consisting of pure dry hydrogen, argon, helium and neon, whereby carbon monoxide gas is evolved, and continuing said heating until the carbon monoxide in said environment is below 1000 p.p.m., and (4) thereafter heating the mixture in contact with flowing hydrogen at a temperature in the range of 900° C. to 1200° C. until the dew point of the effluent hydrogen is below −30° C. In a preferred aspect, the processes of the invention comprise the steps of (1) embedding colloidal thoria in a precipitate of nickel hydroxycarbonate and chromium hydroxycarbonate, (2) drying the precipitate at a temperature in the range of 25 to 450° C., (3) heating the dried product with hydrogen, at a temperature of 200 to 450° C. whereby oxidic nickel compounds therein are reduced to nickel, (4) mixing the so-treated material from 0.85 to 1.0 gram atom of carbon per gram atom of oxygen therein, exclusive of oxygen in the thoria, (5) heating said mixture to a temperature of from 850° to 1050° C. in a flowing atmosphere of pure, dry argon, until the carbon monoxide concentration in the effluent gas is less than 1000 p.p.m., and (6) thereafter continuing to heat the mixture while causing pure, dry hydrogen to flow in contact therewith at a temperature in the range from 1000° to 1150° C. until the dew point of the effluent hydrogen is below −45° C.

In Alexander, Iler and West, U.S. Patent 2,972,529 there are described certain processes for producing dispersions of particulate refractory metal oxides in chromium alloys. These processes consist of depositing the particulate refractory oxide together with oxidic compounds of chromium and the other metal or metals of the alloy, followed by reduction of such oxidic compounds with hydrogen, carbon monoxide, or methane, over an extended period, Example 2, for instance, requiring a total of 98 hours for the complete reduction with hydrogen. Obviously, such extended times unduly increased manufacturing costs, but operation at higher temperatures to increase the reduction rate was avoided because of the dangers of premature sintering and excessive reaction between the alloying metal compounds and the refractory metal oxide. Reduction of metal oxide powders with carbon has, of course, been practiced in the past, but not in an environment involving maintenance of a refractory metal oxide in a dispersed, particulate condition in the product; hence the art has not hitherto recognized criticality in the amount of carbon to use in such reductions and the product obtained according to prior practices employing carbon reduction might contain undesirable residual carbon.

Now according to the present invention it has been found that by preparing a powder mixture containing the particulate refractory oxide and chromium oxide, mixing with this powder a critical amount of carbon, and effecting reduction of the chromium oxide in contact with a flowing stream of hydrogen, argon, helium, or neon, or in vacuum within a critical temperature range, metal chromium-containing compositions can be obtained at economically feasible reduction rates, said compositions containing the particulate refractory oxide in a well-dispersed condition but being substantially free of residual carbon.

Processes of the invention are particularly useful for making particulate refractory oxide dispersions in chromium alloys of one or more metals selected from the group consisting of nickel, cobalt and iron, and especially in nickel-chromium alloys containing 20% of chromium. One can also make other alloys of chromium, such as iron-chromium (73 Fe-27 Cr) and iron-nickel-cobalt-chromium alloys containing, for example, up to 30% chromium. Iron, nickel, or cobalt base alloys containing from 10 to 25% chromium are a preferred group. Specifically, such alloys containing 90 to 50% of the sum of iron, cobalt and nickel, 0 to 20% of the sum of molybdenum and tungsten, and 10 to 25% of chromium are an especially preferred species.

Tungsten and molybdenum are strong carbide formers, and one must be careful, particularly in the preparation of chromium alloys of these metals, that the carbon is uniformly distributed during the reduction so that it can be effective for reduction and not consumed by carbide formation. As just noted, the processes of the invention are particularly adapted to the preparation of alloys of chromium and nickel. Nickel has very little tendency to form carbides; on the other hand, nickel alloys readily with chromium. Apparently, for this reason, the reduction of nickel-chromium-thoria alloys proceeds relatively rapidly. Iron and cobalt are similar to nickel in behavior.

Now having ascertained what particular alloy of chromium it is desired to produce in a process of this invention, one first prepares a mixed oxide powder containing the chromium oxide, the particulate refractory oxide, and the oxide of the alloying element or elements. When reference is made to chromium oxide this will be understood to include oxidic compounds of chromium which upon heating to the temperature ranges involved in the process will convert to chromium oxide. Thus the chromium compound can be hydrous oxide, a hydroxide, a hydroxycarbonate, or any similar oxidic compound which upon heating is converted to chromium oxide. The preferred form of the chromium after such heat conversion is chromic oxide, $Cr_2O_3$.

The art is already familiar with methods for preparing mixed metal oxides suitable as starting materials in the invention. These are described, for instance, in Alexander et al. U.S. Patents 2,972,529, 3,019,103 and 3,085,876 and Funkhouser et al. U.S. Patent 3,024,110. These patents also describe methods for forming the refractory metal oxide in the desired particulate nature. In general, the methods involve the precipitation of the refractory oxide together with the oxidic compound of the constituent which is to be reduced to the metal, and if an alloy is to be formed, also precipitating the oxide of the alloying metal.

The refractory oxide must be in the form of particles of less than 0.25 micron in diameter, preferably less than 0.1 micron, and still more preferably less than .060 micron, and must have a free energy of formation at 1000° C. above 90 kilocalories per gram atom of oxygen in the oxide. Such oxides, and methods for their preparation, are described in the above-mentioned Alexander et al. U.S. Patent 2,972,529 at column 2, line 66 to column 4, line 45. Thus, a typical group of suitable oxides, and their free energies of formation is as follows.

| Oxide: | $\Delta F$. at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| BaO | 97 |
| $ZrSiO_4$ | 95 |
| TiO | 95 |

Of the tabulated oxides, thoria is especially preferred.

The proportion of refractory metal oxide should be about from 0.05 to 5.6, preferably from 0.1 to 3.0% by volume of the total metal content of the final alloy composition, exclusive of the metal content of the refractory oxide.

Having prepared the mixed oxides, they are, if necessary, dried at about 120° C. and can then be calcined at a temperature in the range of up to 450° C., to eliminate water, $CO_2$, oxides of nitrogen, and other volatile constituents.

When preparing an alloy of chromium and a metal easily reduced with hydrogen, such as nickel, one practice is to reduce the oxide of the latter with hydrogen prior to the reduction of the chromium oxide with carbon. This can be done by heating the oxide mass in hydrogen at from 200 to 450° C. Following this initial reduction, the product should be heated to about 1000° C. in hydrogen to reduce the surface area of the powder so that it will not be pyrophoric in air.

Having prepared the mixed oxide powder as above described, and if desired having reduced the alloying oxides with hydrogen, the powder is mixed with up to one gram atom of carbon per gram atom of oxygen combined with the chromium in the chromium oxide. The carbon can be added in a number of ways, one of which is to blend the chromium oxide-filler powder with finely divided carbon. The blending with carbon can be done prior to or subsequent to reduction of oxides of metals such as nickel, iron or cobalt with hydrogen.

The blending can be accomplished in conventional ways, such as, for example, in a cone blender or a ball mill. Although intensive blending is preferred, it is not absolutely essential since reduction can be effected if the carbon is only in reasonable proximity to the chromium oxide during the reduction. The carbon can be added during the precipitation of the hydroxycarbonate.

It is preferred that the carbon used be mainly amorphous. The surface area should be greater than 30 m.²/g. and preferably greater than 100 m.²/g. The ultimate particle size of the preferred carbon is less than 50 millimicrons. It is preferred that the sulfur content be less than 500 p.p.m., more preferred less than 50 p.p.m., and the ash less than 0.2%.

The amount of carbon used is equivalent to or less than the amount required for complete reduction of the chromium oxide. It has been found that excess carbon will react with metals present to form carbides which are undesirable contaminants in the product, and it has further been found that by using a slight deficiency of carbon, one can produce a product free of carbides. In nickel-chromium-thoria alloys, for instance, not more than about 0.02% carbon should be left in the product. Carbides in excess of this amount tend to form large, insoluble precipitate phases in the metal, causing the metal to be weak and brittle.

The amount of carbon used preferably is at least 50% of the stoichiometric requirement, based on the oxygen associated with the chromium. In a preferred case, the amount of carbon is from 90 to 100% based on the oxygen associated with the chromium. Thus the preferred amount is from 0.90 to 1.0 gram atom of carbon per gram atom of oxygen present as chromium oxide.

In those cases, where chromium is precipitated from a trivalent salt, as when $Cr(NO_3)_3$ is precipitated with $$(NH_4)_2CO_3$$

the carbon requirement can be calculated from a chromium analysis, from 2.55 to 3.0 mols of carbon being required for each mol of $Cr_2O_3$, or from 1.27 to 1.5 mols of carbon for each mol of chromium.

Because carbon reacts with hydrogen to form hydrocarbon gases, a small amount of the carbon may be lost in this way, and for this reason, and particularly if large volumes of hydrogen are used during the reduction, one may add enough excess carbon to compensate for this loss. The amount required can readily be determined by monitoring the effluent hydrogen for methane.

In the next step of the process, up to 100% of the chromium oxide present is reduced to chromium by heating with carbon in the range of 850° C. to 1050° C., in an environment selected from vacuum and a flowing stream consisting of at least one gas of the group consisting of pure, dry hydrogen, argon, helium and neon, whereby carbon monoxide is evolved.

Reduction of $Cr_2O_3$ with carbon begins at about 850° C. and in the presence of nickel catalyst at 950° C. the rate of reaction is rapid. In processes of the invention, 90 to 100% of the oxygen associated with the chromium is reduced with carbon, and any unreduced chromium oxide is thereafter reduced with hydrogen at a temperature in the range 900 to 1200° C. The hydrogen is caused to flow in contact with the mixture until the dew point of the effluent hydrogen is below −30° C. When measuring the dew point of the effluent hydrogen it will be understood that the rate and conditions of flow of the hydrogen over the material being reduced is such as to permit substantial equilibrium to be reached with any reducible metal oxide remaining, so that the dew point is a true measure of the amount of unreduced oxide present.

As a practical matter the reduction with carbon is accomplished by placing the mixture of oxides and carbon in a furnace with an atmosphere of pure, dry argon flowing through it, and heating the mixture to the above-indicated temperature range. Progress of the reduction can be followed by analyzing the effluent gas. Completion of the carbon reduction will be accompanied by a disappearance of carbon monoxide, i.e. to less than 1000 p.p.m. CO in the effluent gas. The final stages of the reduction can be completed with hydrogen. Hydrogen reduction should be continued until the oxygen, except oxygen associated with the refractory oxide, is less than 0.5% and preferred less than 0.1%. This can be done by continuing the reduction until the moisture content of the effluent hydrogen is low, that is, the dew point of the gas evolving from the reduction chamber at 1100° C. is less than −30° C., and preferably less than −45° C.

During carbon reduction the flow rate of gas should be sufficient to sweep out carbon monoxide as it is formed. However, the flow rate should not be so excessive as to cause metal powder to be entrained in the gas stream.

The gas used during the carbon reduction and subsequent hydrogen reduction steps should be extremely pure, that is, completely free of nitrogen, oxygen, sulfur and compounds of these. When reference is made to the purity of the gas, it is the purity as added which is meant. It will be understood that as soon as the gas comes in contact with the mixed oxides and carbon, its composition begins to change. The in-flowing gas can be purified by passing it through a hot getter of spongy titanium at 900° C. Prior to passing the gas through the getter, oxygen should be catalytically oxidized to water and the water removed in a drier.

The presence of the particulate refractory metal oxide during reduction keeps the metal fraction from sintering excessively. In the absence of the refractory oxide, "pockets" of entrapped chromium oxide are formed, thus making it very difficult to complete the reduction of the final traces of chromium oxide. Accordingly, the filler serves an important and necessary function as far as reduction is concerned.

The invention will be better understood by reference to the following illustrative examples.

Example 1

This example describes a method for preparing a nickel-20% chromium alloy containing 2% thoria by volume therein, the thoria being in the form of particles of colloidal size. The process consists of coprecipitation of nickel hydroxycarbonate, chromium hydroxide, and thorium hydroxide to form a gel, heating the filtered composite gel to drive off water and entrapped nitrates and carbonates, reducing the nickel oxide portion of the oxides formed with hydrogen and the chromium oxide portion with carbon, and densifying the powder so produced. The carbon used in the reduction step is provided in the form of a finely divided carbon black.

The coprecipitated gel was prepared as follows:

An ammonium carbonate solution was prepared by dissolving 600 lb. of ammonium bicarbonate in 1040 lb. of water, then adding 486 lb. of aqueous ammonium hydroxide, containing 28.0% free ammonia. The resulting solution had a specific gravity of 1.111 gm./cc. at 25° C. A second solution was made up by dissolving 800 lb. of $Ni(NO_3)_2 \cdot 6H_2O$, 300 lb. of $Cr(NO_3)_3 \cdot 9H_2O$, and 10 lb. of $Th(NO_3)_4 \cdot 4H_2O$ in 420 lb. of water. The specific gravity at 25° C. of this salt solution was 1.480 gm./cc.

The coprecipitated gel was formed in a reactor consisting of a tank with a conical bottom. The bottom of the tank was connected to the inlet of a centrifugal pump. To the downstream side of the pump was attached a return line to which were connected two inlet lines through T's. Beyond the T's the return line discharged into the tank, thereby allowing continuous recycle of the tank contents. Initially the tank was charged with about 6 gallons of liquor from the filtration of a previously prepared gel. The recycle pump was started, and the two solutions containing the desired quantities of reagents were then added into the middle of the flowing stream through the T tubes. The rates of addition were controlled by flow meters so as to maintain the pH of the solution in the tank at about 7.0. The solutions were fed over a period of 3⅓ hours, at which time all the salt and 1135 lb. of carbonate solution had been fed. During the run pH was checked frequently, and it remained essentially constant, the final value being 7.0.

The slurry was circulated for a few minutes after the addition of the reagents had been completed and then was pumped to a filter. The precipitate was filtered, washed with water, and dried at a temperature of about 110° C. for 16 hours. The temperature of the drying was then increased to 450° C., and the dried cake held at this temperature for a period of 4 hours to remove residual nitrates and carbonate and thereby convert the product entirely to an oxide mixture. The dried product was then pulverized by grinding in a hammer-mill.

A portion of the oxide product was blended with carbon black in the ratio of 6.2 parts carbon per 100 parts oxide. "Mogul" carbon black, a product of the Godfrey Cabot Co., Inc., was used. Typical analyses of this product are:

Surface area—340 m.$^2$/gm.
Particle size—22 millimicrons (by electron micrograph)
Fixed carbon—87%
Volatile content—13%
Ash—0.01%

Blending was carried out for one hour in a twin shell blender. The weights of materials blended were in the ratio of 1.0 gram atom of fixed carbon per gram atom of oxygen present as $Cr_2O_3$.

A 745-gram sample of the blended mixture was loaded into trays to a ¾-inch depth and placed in a furnace. The furnace was heated to about 425° C. with hydrogen passing over the oxide powder. The hydrogen gas stream had previously been carefully freed of oxygen, sulfur, nitrogen, and moisture. This purification was accomplished by passing commercial tank hydrogen through a catalyst bed to convert oxygen to water, then through a dryer, and finally over chips of chromium and zirconium-titanium alloy, said chips being held at 850 to 900° C., in order to remove nitrogen, sulfur and residual traces of oxygen. In this way, extremely dry, pure hydrogen was prepared. The furnace was held at 425° C. for 4 hours. The hydrogen flow was then discontinued, and argon was admitted to the reactor at a flow rate such that the gas velocity over the powder was about 5 linear feet per minute. The reactor temperature was then raised to about 975° C. and held for 36 hours at which time the effluent gas analyzed less than 1000 p.p.m. CO. The argon was turned off and replaced with hydrogen flowing at a velocity of about 25 feet per minute across the powder. The reactor was held under these conditions at 975° C. for two additional hours, and then the temperature was raised to 1100° C. where it was held for 10 hours after which time the effluent hydrogen had a dew point of less than −45° C. and contained 80 p.p.m. CO. The furnace was cooled to room temperature and the sintered product was recovered, ground, and passed through a 60-mesh screen.

The product thus obtained was a fine powder containing thoria at a volume loading of 2% uniformly dispersed in an alloy matrix of nickel and chromium combined in the ratio of 80% Ni-20% Cr by weight. Oxygen analyses of the reduced material showed that there was less than 0.05% oxygen present in excess of the oxygen in the $ThO_2$, and the residual carbon analysis was 22 parts per million.

Example 2

A nickel-chromium-thoria alloy containing 2.0 weight percent thoria was prepared as follows. Three feed solutions were prepared with consisted of:

(a) 68.4 lb. $Ni(NO_3)_2 \cdot 6H_2O$ and 25.3 lb.

$Cr(NO_3)_3 \cdot 9H_2O$ dissolved and diluted to 40 liters with water.

(b) 810 grams of 19.85% $ThO_2$ aquasol diluted to 40 liters.

(c) $(NH_4)_2CO_3$ dissolved in distilled water to make 40 liters of a 4.5 normal solution.

The three solutions were injected into a recycle stream via T's as described in Example 1, with the exception that a third inlet T was attached for feeding the third solution. The solutions were fed over a period of ½ hour, and the rates of addition were controlled by flow meters. The pH of the precipitating solution was taken at frequent time intervals, the value remaining essentially constant at 7.0. At the conclusion of the feed addition the precipitate was pumped to a filter. The cake was washed by reslurrying the solids in 70 liters of distilled water and refiltering. The cake was then dried and ignited according to the cycle described in Example 1.

The powder obtained by grinding the dried oxide cake was blended for one hour in a twin-shell blender with a previously-dried and desulfurized carbon black (75 p.p.m.). Desulfurized carbon black was obtained by heating "Mogul" carbon to 1100° C. in a flowing hydrogen stream for about 40 hours.

In the blending a 4727-gram portion of the oxide powder was mixed with 260 grams of carbon, an amount equivalent to about 3.0 gram atoms per gram atom of contained $Cr_2O_3$. The blend was then loaded into trays to a depth of about ¾" and the trays were placed in the reduction furnace.

Hydrogen was introduced to the furnace at such a rate that the velocity across the oxide powder was about 20 linear feet per minute. The furnace was heated to 400 to 450° C. and held at this temperature for about three hours. It was then heated at a rate of 100° C. per hour to 1025 to 1050° C. The sample was held or eight hours at this temperature under hydrogen, after which time the temperature was increased to 1100 to 1130° C. An additional 12 hours were spent at this temperature before the furnace was cooled.

After cooling the furnace the product was recovered and screened to pass 60-mesh and analyzed for excess oxygen and carbon, the values being 0.087% and 35 parts per million, respectively. The powder was then useful for preparation of metal by conventional procedures of compaction and extrusion.

Example 3

In this example an iron-chromium alloy containing a finely dispersed $ThO_2$ phase is prepared. Three feed solutions are made as follows:

(1) 3715 grams of $Fe(NO_3)_2 \cdot 6H_2O$ and 2150 grams of $Cr(NO_3)_3 \cdot 9H_2O$ dissolved and diluted to 6 liters with distilled water.

(2) 130 grams of 20% $ThO_2$ aquasol diluted to 6 liters with water.

(3) $(NH_4)_2CO_3$ dissolved in 13 liters of water to a concentration of 4.0 normal.

The three solutions are fed into a T mixer through which a recycle stream is flowing as described in Example 2. The solutions are fed over a one-hour period, with the rates of addition being controlled by flowmeters. The metal salt solution and thoria colloid are fed at equal rates and the carbonate flow is about double this rate. The pH of the precipitating solution remains about 7.0 throughout the addition period, following which the precipitate is filtered, washed, and dried. The cake is ignited for four hours at 450° C. to remove residual nitrates and carbonate and, finally, the oxide product is ground in a hammer-mill.

The powder obtained is loaded into trays and placed in a furnace. The iron oxide portion of the mixture is prereduced with hydrogen. The furnace is first heated to 450° C. and held 4 hours. The temperature is then raised to 900° C. held one hour, and cooled. The partly-reduced oxide powder is removed from the furnace and analyzed for oxygen. Finely-divided carbon black in an amount stoichiometrically equivalent to 98% of the oxygen present as $Cr_2O_3$ is then blended with the iron-chromic oxide-thoria powder. The mixture is reloaded into trays to a depth of about three-quarter inch, and heated to 975° C. under a flowing helium atmosphere so that the gas velocity is at least 5 linear feet per minute over the powder and preferably as high as 20 feet per minute. The powder is held at 975° C. for about 30 hours, then heated to 1100° C. for an additional 12 hours in a hydrogen atmosphere. The furnace is cooled and the product recovered.

The alloy powder thus obtained contains about 2 volume percent of small, uniformly dispersed $ThO_2$ particles embedded in a matrix alloy, 72% iron and 28% chromium, by weight. It is easily fabricated by powder metallurgical procedures to give a dense metal article having improved strength and oxidation resistance.

We claim:

1. In a process for producing metal alloy compositions containing chromium in which alloy refractory metal oxide particles are dispersed, the steps comprising (1) preparing a mixed oxide powder containing (a) chromium oxide, (b) an oxide of a metal selected from the group consisting of iron, cobalt and nickel, and (c) a refractory oxide in the form of particles less than 0.25 micron in diameter, and having a free energy of formation at 1000° C. above 90 kilocalories per gram atom of oxygen in the oxide, (2) mixing with said powder up to one gram atom of carbon per gram atom of oxygen combined with the chromium in said chromium oxide, (3) heating the mixture at a temperature in the range from 850° C. to 1050° C. in an environment selected from vacuum and a flowing stream consisting of at least one gas of the group consisting of pure dry hydrogen, argon, helium and neon, whereby carbon monoxide gas is evolved, and continuing said heating until the carbon monoxide in said environment is below 1000 p.p.m., and (4) thereafter heating the mixture in contact with flowing hydrogen at a temperature in the range of 900 to 1200° C. until the dew point of the effluent hydrogen is below −30° C.

2. In a process for producing metal alloy compositions containing about from 10 to 30% by weight of chromium in which alloy refractory metal oxide particles are dispersed, the steps comprising (1) preparing a mixed oxide powder containing (a) chromium oxide, (b) an oxide of a metal selected from the group consisting of iron, cobalt and nickel, and (c) a refractory oxide in the form of particles less than 0.25 micron in diameter, and having a free energy of formation at 1000° C. above 90 kilocalories per gram atom of oxygen in the oxide, the proportion of (a) to (b) being such that the chromium metal content of (a) is, by weight, from 10 to 30% of the total metal contents of (a) plus (b) and the proportion of (c) being about from 0.05 to 5.6% by volume of the total metal contents of (a) plus (b), (2) mixing with said powder up to one gram atom of carbon per gram atom of oxygen combined with the chromium in said chromium oxide, (3) heating the mixture at a temperature in the range from 850° C. to 1050° C. in a flowing stream of pure, dry argon, whereby carbon monoxide gas is evolved, and continuing said heating until the carbon monoxide in the effluent argon is below 1000 p.p.m., and (4) thereafter heating the mixture in contact with flowing hydrogen at a temperature in the range of 1000 to 1150° C. until the dew point of the effluent hydrogen is below −30° C.

3. In a process for producing nickel base alloy compositions containing 15 to 25% chromium in which compositions particles of thoria having average diameter less than 60 millimicrons are dispersed, the steps comprising (1) embedding colloidal thoria in a precipitate of nickel hydroxycarbonate and chromium hydroxycarbonate, (2) drying the precipitate at a temperature in the range of 25 to 450° C., (3) mixing the precipitate with from 2.5 to 3.0 mols of carbon per mol of $Cr_2O_3$ therein, (4) heating the dried product with hydrogen, at a temperature below 450° C. whereby oxidic nickel compounds therein are reduced to nickel, (5) thereafter heating to a temperature of from 850 to 975° C. in a flowing stream of pure, dry argon, whereby carbon monoxide gas is evolved, and continuing said heating until the concentration of carbon monoxide in the effluent stream is below 1000 p.p.m., and (6) thereafter continuing to heat the mixture while causing pure, dry hydrogen to flow in contact therewith at a temperature in the range 950 to 1100° C. until the dew point of the effluent hydrogen is below −45° C.

4. A process of claim 3 wherein the heating in step (5) is at a temperature in the range of 925 to 975° C.

References Cited

UNITED STATES PATENTS

| | | | |
|---|---|---|---|
| 2,785,974 | 3/1957 | Moore | 75—206 |
| 2,833,645 | 5/1958 | Erasmus | 75—130.5 X |
| 2,848,324 | 8/1958 | Krapf | 75—206 |
| 2,972,529 | 2/1961 | Alexander et al. | 75—.54 |
| 3,044,867 | 7/1962 | Edstrom | 75—206 X |
| 3,082,084 | 3/1963 | Alexander et al. | 75—206 |
| 3,129,093 | 4/1964 | Alexander et al. | 75—.55 |

HYLAND BIZOT, *Primary Examiner.*

H. W. TARRING, *Assistant Examiner.*